Aug. 25, 1936.  M. R. MORITZ ET AL  2,052,400
WELDING FLUX
Filed July 26, 1935
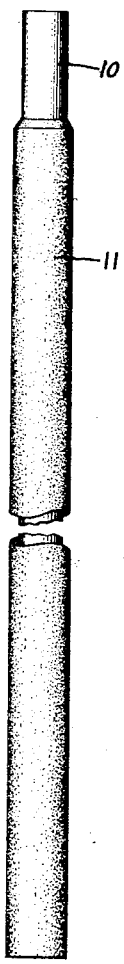
Inventors:
March R. Moritz,
Thomas C. R. Shepherd,
by Harry E. Dunham
Their Attorney.

Patented Aug. 25, 1936

2,052,400

UNITED STATES PATENT OFFICE 2,052,400

WELDING FLUX

March R. Moritz, Sale Moor, and Thomas C. R. Shepherd, Manchester, England, assignors to General Electric Company, a corporation of New York Application July 26, 1935, Serial No. 33,372
In Great Britain August 15, 1934

3 Claims. (Cl. 148—25)

Our invention relates to welding fluxes and particularly to fluxes applied to arc welding electrodes as a coating or as a filler for braidings, wrappings or coverings of cellulosic material, asbestos, and the like which are applied to the electrodes as part of the fluxing material.

A large number of compositions have been suggested for use as fluxes in arc welding and among these are various mixtures in which liquid sodium silicate is used as a binder to hold the flux in place on the electrode.

It is an object of our invention to provide an improved binding material for arc welding fluxes.

It is a further object of our invention to provide novel arc welding fluxes containing our improved binding material.

Further objects of our invention will become apparent from a consideration of the following description taken in connection with the accompanying drawing which illustrates an electrode provided with a flux coating in accordance with our invention.

The electrode shown in the drawing comprises a metallic core 10 coated with the flux composition 11. The electrode illustrated is of the type used in hand welding which is supplied in short lengths with one end thereon bared for insertion in an electrode holder by means of which the welding current is supplied thereto. It is to be understood, however, that our invention is not limited to metallic electrodes used in hand welding but is generally applicable in the field of welding where fluxes are used.

The coating on this electrode may vary widely in composition but in accordance with our invention is characterized by the use of an improved binding material. According to our invention, an organic silicate diluted when necessary in an organic solvent is used as a binder in place of liquid sodium silicate heretofore employed for this purpose. The particular compound which we employ is ethyl orthosilicate which may be diluted when necessary with commercial methylated spirits. Ethyl orthosilicate is frequently identified in a descriptive sense as silicon ester and sold as a commercial product under that name. The commercial product may be partially decomposed giving a mixture containing silica in solution.

The use of ethyl orthosilicate as a binder in flux composition for use in arc welding has the following advantages: (1) It contains no moisture. (2) It can be dried quickly and it does not necessarily require heat to do this as it can be done by chemical means. (3) When dried only pure silica is deposited, a material which melts and fluxes quietly without any liability to explosion and "spitting".

In accordance with our invention ethyl orthosilicate may be used as a binder in place of liquid sodium silicate in the compositions described in United States Letters Patent 1,898,068 Lucian B. Thomson and Verni J. Chapman, February 2, 1933 and 1,992,792 James M. Weed, February 26, 1935. The amount of ethyl orthosilicate required in these fluxes may be approximately one-half that given for liquid sodium silicate in the compositions described and claimed in these Letters Patent.

The following are two specific examples of flux compositions in accordance with our own invention in which ethyl orthosilicate is used, the proportions being given by weight.

|   |                     | Per cent |
|---|---------------------|----------|
|(1)| Iron oxide          | 25       |
|   | Ferro manganese     | 20       |
|   | Titanium oxide      | 25       |
|   | Kaolin              | 23       |
|   | Ethyl orthosilicate | 7        |
|(2)| Pyrolusite ore      | 45       |
|   | Silica              | 40       |
|   | Iron oxide          | 5        |
|   | Ethyl orthosilicate | 10       |

In these compositions the iron oxide is preferably magnetic iron oxide, the titanium oxide is preferably titanium dioxide, and the pyrolusite ore contains about 90% of pyrolusite (manganese dioxide) with minor impurities of which silica forms the greater portion. When ethyl orthosilicate is obtained as a commercial product it may be necessary to regulate its consistency by adding thereto commercial methylated spirits.

It is to be understood that our invention involving the use of ethyl orthosilicate as a binder in flux compositions is not specifically limited to the above flux compositions referred to. It is also to be understood that the improved fluxes in accordance with our invention may be employed otherwise than as coatings on welding electrodes.

What we claim as new and desire to secure by Letters Patent of the United States is:

1. A flux for use in welding having as a binder a mixture of ethyl orthosilicate in an organic solvent.

2. A flux for coating arc welding electrodes having a binder of ethyl orthosilicate.

3. A flux composition for use in welding comprising the following ingredients in substantially the following proportions by weight:

|                     | Per cent |
|---------------------|----------|
| Iron oxide          | 25       |
| Ferro manganese     | 20       |
| Titanium oxide      | 25       |
| Kaolin              | 23       |
| Ethyl orthosilicate | 7        |

MARCH R. MORITZ.
THOMAS C. R. SHEPHERD.